(12) United States Patent
Miyamae

(10) Patent No.: US 11,496,420 B2
(45) Date of Patent: Nov. 8, 2022

(54) CONTACT SYSTEM AND NON-TRANSITORY COMPUTER READABLE MEDIUM STORING CONTACT PROGRAM

(71) Applicant: FUJIFILM Business Innovation Corp., Tokyo (JP)

(72) Inventor: Eiji Miyamae, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 241 days.

(21) Appl. No.: 16/518,996

(22) Filed: Jul. 23, 2019

(65) Prior Publication Data

US 2020/0314038 A1 Oct. 1, 2020

(30) Foreign Application Priority Data

Mar. 25, 2019 (JP) .............................. JP2019-056036

(51) Int. Cl.
| | |
|---|---|
| *G06F 15/16* | (2006.01) |
| *H04L 51/02* | (2022.01) |
| *H04L 51/04* | (2022.01) |
| *H04L 51/42* | (2022.01) |
| *H04L 51/52* | (2022.01) |
| *H04L 51/226* | (2022.01) |
| *H04L 67/53* | (2022.01) |

(52) U.S. Cl.
CPC .............. *H04L 51/02* (2013.01); *H04L 51/04* (2013.01); *H04L 51/226* (2022.05); *H04L 51/42* (2022.05); *H04L 51/52* (2022.05); *H04L 67/53* (2022.05)

(58) Field of Classification Search
CPC ......... H04L 51/02; H04L 51/04; H04L 51/22; H04L 51/26; H04L 51/32; H04L 67/12; H04L 67/20; H04L 51/14; H04L 51/28
USPC .......................... 709/204, 206, 224, 226, 229
See application file for complete search history.

(56) References Cited

U.S. PATENT DOCUMENTS

| | | | |
|---|---|---|---|
| 7,245,907 B1 * | 7/2007 | Numata .............. | H04W 12/082 455/419 |
| 2009/0131088 A1 * | 5/2009 | Kirchmeier ......... | H04L 12/1895 455/466 |
| 2009/0225968 A1 * | 9/2009 | Paranjape ........... | H04M 1/2757 379/201.02 |

(Continued)

FOREIGN PATENT DOCUMENTS

| | | |
|---|---|---|
| JP | 2001-325343 | 11/2001 |
| JP | 2003-289384 | 10/2003 |

*Primary Examiner* — Farzana B Huq
(74) *Attorney, Agent, or Firm* — JCIPRNET

(57) ABSTRACT

A contact system includes an ID information management section that discloses and manages ID information for specifying a user to a third party; a contact information management section that gives priorities to respective pieces of contact information of the user of a plurality of contact tools, and manages the respective pieces of contact information in a private manner to the third party; a reception section that receives a contact request designating the ID information as a contact destination from the third party; a selection section that selects contact information to be used, from the respective pieces of contact information of the user according to the received ID information, based on the priorities; and a contact relay section that relays contact by the corresponding contact tool, by using the selected contact information.

7 Claims, 10 Drawing Sheets

(56) References Cited

U.S. PATENT DOCUMENTS

| | | | |
|---|---|---|---|
| 2010/0260326 A1* | 10/2010 | Michaelis | H04L 67/22 379/93.02 |
| 2011/0217959 A1* | 9/2011 | Noda | H04M 1/57 455/414.1 |
| 2013/0072148 A1* | 3/2013 | Bhatnager | H04L 51/36 455/405 |

* cited by examiner

FIG. 2

| PUBLIC NAME |
|---|
| USER A |
| USER B |
| USER C |

FIG. 3

| CONTACT TOOL | TYPE | CONTACT DESTINATION INFORMATION | PRIORITY | AVAILABLE CONTACT WHEN GOING OUT | AVAILABLE CONTACT WHEN LEAVING SEAT | AVAILABLE CONTACT FROM ABROAD |
|---|---|---|---|---|---|---|
| E-MAIL | SEND TYPE | hogehoge@example.com | 1 | | ○ | ○ |
| SNS | SEND TYPE (WITH IMMEDIACY) | SNS_hoge | 2 | ○ | ○ | ○ |
| CHAT | SEND TYPE (WITH IMMEDIACY) | Chat_hoge | 3 | | ○ | |
| FIXED TELEPHONE | IMMEDIATE TYPE | 045-1234-5678 | 4 | | | |
| MOBILE PHONE | IMMEDIATE TYPE | 090-1234-5678 | 5 | ○ | | |

FIG. 5

| CONTACT TOOL | CONTACT DESTINATION INFORMATION |
|---|---|
| SNS | SNS_hoge |
| MOBILE PHONE | 090-1234-5678 |

FIG. 6

| CONTACT TOOL | CONTACT DESTINATION INFORMATION |
|---|---|
| E-MAIL | hogehoge@example.com |
| SNS | SNS_hoge |
| CHAT | Chat_hoge |
| FIXED TELEPHONE | 045-1234-5678 |
| MOBILE PHONE | 090-1234-5678 |

FIG. 7

| CONTACT TOOL | CONTACT DESTINATION INFORMATION |
|---|---|
| E-MAIL | hogehoge@example.com |
| SNS | SNS_hoge |
| CHAT | Chat_hoge |

FIG. 10

| CONTACT TOOL | TYPE | CONTACT DESTINATION INFORMATION | PRIORITY | | |
|---|---|---|---|---|---|
| | | | NORMAL MODE | CONTACT MODE | SEND TYPE MODE |
| E-MAIL | SEND TYPE | hogehoge@example.com | 1 | 5 | 1 |
| SNS | SEND TYPE (WITH IMMEDIACY) | SNS_hoge | 2 | 3 | 2 |
| CHAT | SEND TYPE (WITH IMMEDIACY) | Chat_hoge | 3 | 4 | 3 |
| FIXED TELEPHONE | IMMEDIATE TYPE | 045-1234-5678 | 4 | 1 | - |
| MOBILE PHONE | IMMEDIATE TYPE | 090-1234-5678 | 5 | 2 | - |

CONTACT SYSTEM AND NON-TRANSITORY COMPUTER READABLE MEDIUM STORING CONTACT PROGRAM

CROSS-REFERENCE TO RELATED APPLICATIONS

This application is based on and claims priority under 35 USC 119 from Japanese Patent Application No. 2019-056036 filed Mar. 25, 2019.

BACKGROUND

(i) Technical Field

The present invention relates to a contact system, and a non-transitory computer readable medium storing a contact program.

(ii) Related Art

From the viewpoint of personal information protection, contact information may not be disclosed to a third party.

For example, JP2003-289384A describes a method by which users who use a communication service such as a bulletin board on the Internet can contact each other without knowing the actual contact information.

JP2001-325343A describes a system in which contact such as reservation to a store is performed on behalf of the store while securing the confidentiality of contact procedures. When the contact destination does not support data communication such as e-mail, contact is made by phone or fax.

SUMMARY

In JP2003-289384A, the system makes contact, based on the confidentially registered contact information. However, uniform contact from the system may be inconvenient for the person to be contacted.

In JP2001-325343A, communication means that the other party has is used, but only uniform selection thereof is made similar to JP2003-289384A.

Aspects of non-limiting embodiments of the present disclosure relate to a contact system, and a non-transitory computer readable medium storing a contact program which suppress or prevent uniform contact from being made to the party to be contacted in a case where contact information is kept private.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a contact system including: an ID information management section that discloses and manages ID information for specifying a user to a third party; a contact information management section that gives priorities to respective pieces of contact information of the user of a plurality of contact tools, and manages the respective pieces of contact information in a private manner to the third party; a reception section that receives a contact request designating the ID information as a contact destination from the third party; a selection section that selects contact information to be used, from the respective pieces of contact information of the user according to the received ID information, based on the priorities; and a contact relay section that relays contact by the corresponding contact tool, by using the selected contact information.

BRIEF DESCRIPTION OF THE DRAWINGS

Exemplary embodiment(s) of the present invention will be described in detail based on the following figures, wherein:

FIG. 2 is a diagram showing an example of a public name list;

FIG. 3 is a diagram showing an example of a contact destination list including items of contact conditions;

FIG. 5 is a diagram showing an example of a contact destination list selected when going out;

FIG. 6 is a diagram showing an example of a contact destination list selected at a normal time;

FIG. 7 is a diagram showing an example of a contact destination list selected when leaving a seat;

FIG. 10 is a diagram showing an example of a contact destination list including items of mode.

DETAILED DESCRIPTION

Hereinafter, an exemplary embodiment of the present invention will be described in detail with reference to the accompanying drawings.

Hereinafter, an exemplary embodiment of the present invention will be described in detail with reference to the accompanying drawings. In the explanation, it is assumed that a person working in an organization such as a company is contacted from within the organization or from outside the organization. Usually, in an organization, contact information such as a fixed telephone number and an e-mail address are disclosed, and communication from within the organization is performed using the contact information. However, for example, when the user is going out, such contact cannot be made. In this case, the personal mobile phone may be contacted, but the phone number of the personal mobile phone may not be disclosed in the organization for protecting personal information and the like. Further, outside the organization, contact information is generally protected at a higher level than in the organization. Therefore, contact from outside the organization into the organization is often more difficult than contact from within the organization. The contact relay system according to the exemplary embodiment is used to relay contacts in such a situation.

Figure 1:
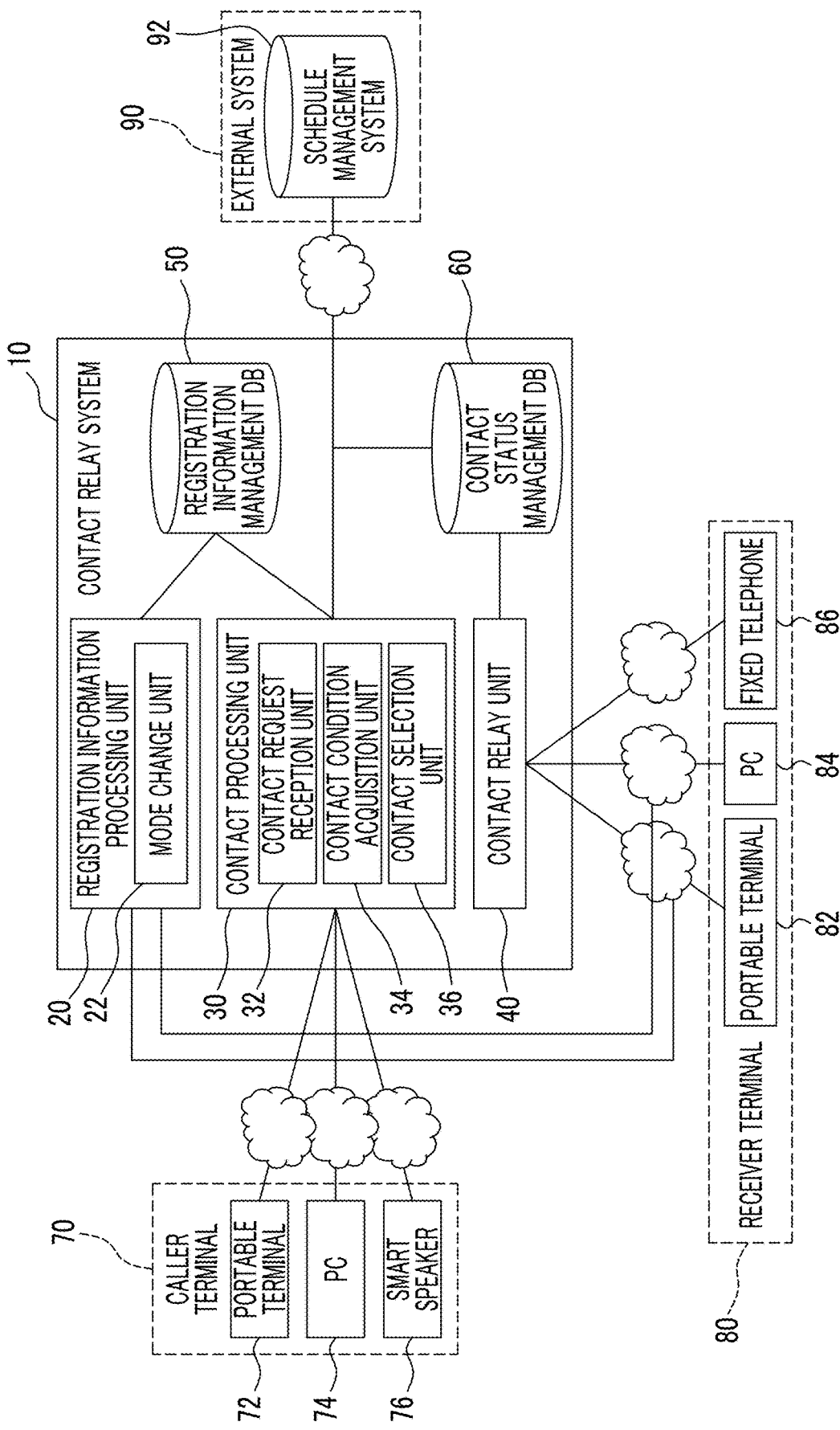
FIG. 1 is a block diagram showing a schematic configuration of a contact relay system according to an exemplary embodiment.

FIG. 1 is a block diagram showing a schematic configuration of a contact relay system 10 according to an exemplary embodiment; The contact relay system 10 is an example of a contact system, and relays contact between users. In addition to the contact relay system 10, a caller terminal 70, a receiver terminal 80, and an external system 90 are also illustrated in FIG. 1.

The contact relay system 10 can be constructed, for example, using a general-purpose personal computer (PC).

The PC is provided with computer hardware such as an arithmetic device such as a central processing unit (CPU), a storage device such as a semiconductor memory, a communication device that incorporates a communication circuit and performs wired or wireless communication, a display device such as a display, and an input device such as a keyboard or mouse A program (also called software) such as an operating system (OS) that performs basic processing and an application program (application) that performs specific application processing is installed on a PC, and various functions of the relay system 10 are realized by controlling computer hardware. However, the contact relay system 10 may be constructed using, for example, plural devices communicably connected, instead of a single PC.

In the contact relay system 10, a registration information processing unit 20, a contact processing unit 30, a contact relay unit 40, a registration information management database (DB) 50, and a contact status management DB 60 are constructed.

The registration information processing unit 20 performs processing of registering and updating a user who is a receiver. Registering and updating can be performed by the administrator of the contact relay system 10 or by the user himself through the receiver terminal 80. The information to be registered includes a public name, contact information, priority information, and the like. The public name is an example of information that is disclosed to a third party and managed. The ID information is an abbreviation of Identification information, and means information for identifying a user. The contact information is information that is set as a contact destination in various contact tools, and is secretly managed such that it cannot be referred to by a third party. However, some pieces of contact information can be set such that disclosure is made to a third party, with or without limiting the range of disclosure. The priority information is information to be referred to in selecting which contact information to use. The priority information can be secretly managed such that third parties cannot refer to it along with contact information. However, in order to give the user who is the caller the predictability of what the contact tool will be, a third parties may be able to refer to information on what prioritization to which contact tool. The contact tool is a means to contact the other party by communication, such as a fixed telephone, a mobile phone, an e-mail, and a social network service (SNS). An example of the registered contact destination list will be described in detail later.

The registration information processing unit 20 can also set each priority for using the contact information for each mode. In order to utilize this mode, the registration information processing unit 20 is provided with a mode change unit 22 which is an example of a mode change reception section. The mode change unit 22 performs a process of setting and changing a mode in accordance with an instruction from the user through the receiver terminal 80, and stores the set and changed mode in the registration information management DB 50. In a case where the mode is changed, the priority for using the contacts is changed. The specific content of the mode will be described later.

The registration information processing unit 20 and the registration information management DB 50 function as an ID information management section that publicly manages ID information, and also function as a contact information management section that privately manages contact information.

The contact processing unit 30 includes a contact request reception unit 32, a contact condition acquisition unit 34, and a contact selection unit 36.

The contact request reception unit 32 is an example of a reception section, and receives a request for contact through the caller terminal 70. The contact request is generally input through an application installed in the caller terminal 70, and the contact request reception unit 32 receives the contact request based on the input. At the time of reception, the public name of the other party to be contacted, information of the contact tool available from the caller terminal 70, and the like are input. In addition, in a case of using a send type contact tool, a message to be sent is also input.

The contact condition acquisition unit 34 is an example of an acquisition section, and acquires contact conditions for controlling which contact tool a user who is a receiver is contacted through. As the contact condition, schedule information of a user who is a receiver can be set. In this case, the contact condition acquisition unit 34 acquires, for example, schedule information of the user who is a receiver from the schedule management system 92 in the external system 90. In addition, the contact conditions can include conditions regarding the user who is a caller, such as the affiliation of the user who is a caller, the language used, and the like. In this case, the contact condition acquisition unit 34 acquires information on the user who is a caller, based on the communication at the time of the contact request. Further, based on the information received by the contact request reception unit 32, the contact condition acquisition unit 34 acquires information on the contact tool available at the caller terminal 70 as the contact condition.

The contact selection unit 36 is an example of a selection section. The contact selection unit 36 searches the registration information management DB 50 using the contact request received by the contact request reception unit 32 and the contact condition acquired by the contact condition acquisition unit 34, and creates a selection list with the contact tool that can be contacted and the corresponding contact information in order of priority. Then, from the selection list, the contact tool with the highest priority and the contact information are selected. In a case where the contact by the selected contact tool cannot be reached within the set time, the next contact tool and the corresponding contact information are selected in the order of priority from the selection list.

The contact relay unit 40 is an example of a contact relaying section, and relays a contact using the corresponding contact information, by using the contact tool selected by the contact selection unit 36. Specifically, in a case where the contact tool is of a send type such as e-mail, and sends to the contact information, a message which is received by the contact request reception unit 32 and is temporarily stored in the contact status management DB 60. In addition, in a case where the contact tool is of an immediate type such as a voice call, a call is made to the receiver terminal 80, and a voice connection is established with the user who receives the contact by the contact request reception unit 32, and a voice call is relayed.

In the registration information management DB 50, the public name of each user is registered, and the contact information for each contact tool of the user, the priority of the contact, and the like are registered and managed. The public name is managed in a public state such that the caller terminal 70 can refer to the public name. Here, "can refer to" means, for example, a state where setting is made such that information on the public name can be accessed, where a list of public names can be displayed, public names can be searched for, or whether or not a designated public name is registered can be checked. The range of users who can refer to public names can be unlimited, and for example, the range can be set such that public names can be referred to from all terminals connected to the Internet. In addition, it is also possible to limit the range of users that can be referred to, for example, it is possible to use a mode which allows references to registered users or a mode which allows references only to users accessing from a specific network. A specific example of the registered information will be described later.

The contact status management DB 60 manages information on the progress of contact by the contact relay unit 40. For example, in a case where the contact relay unit 40 transmits a message through a send type communication tool, the contact relay unit 40 manages the record of the communication. Further, in the contact status management DB 60, information such as a message transmitted and received in the contact tool is also temporarily stored and managed.

The caller terminal 70 is a terminal device that the caller uses for communication. In FIG. 1, a portable terminal 72, a PC 74, and a smart speaker 76 are illustrated as the caller terminals 70. Here, the portable terminal 72 refers to an easy-to-carry device having a computer function, such as a smartphone, a tablet or the like. Usually, an application for using the contact relay system 10 is installed in the portable terminal 72 and the PC 74, and an operation using the GUI of the application is performed. The smart speaker 76 is a device having a computer function mainly operated by voice input and voice output. By installing an application for using the contact relay system 10 in the smart speaker 76 as well, it becomes possible to use the contact relay system 10 using voice. From the caller terminal 70, processing for acquiring a public name from the contact relay system 10 and processing for specifying a public name and making a contact request are performed. The caller terminal 70 has a function of using both transmission and reception of a message by e-mail or the like and a voice call. Therefore, it is possible to correspond to the contact tool selected in the contact relay system 10.

The receiver terminal 80 is a terminal device that the receiver uses for communication. In FIG. 1, a portable terminal 82, a PC 84, and a fixed telephone 86 are illustrated as the receiver terminals 80. The user who is the receiver contacts with the caller, by using the contact tool using the receiver terminal 80. In addition, the user who is the receiver, for example, registers or changes the public name, the contact information, the priority information, and the like in the registration information processing unit 20 of the contact relay system 10 using the GUI of the portable terminal 82 or the PC 84, and also sets and changes a mode. It should be noted that the user who is the receiver may be also the user who is the caller, and the receiver terminal 80 may also be the caller terminal 70.

The external system 90 is, for example, a system that is managed and operated separately from the contact relay system 10. In FIG. 1, a schedule management system 92 is illustrated as the external system 90. The schedule management system 92 is, for example, a system provided by a private company on the Internet, or a system provided by an organization to which a user who is a receiver belongs. The schedule management system 92 receives schedule information of a user who is a receiver, and performs management such that the user or a person in a specific allowed range can refer to the schedule information through the network. In the exemplary embodiment, it is assumed that the contact relay system 10 has granted the user who is the receiver an access to the schedule management system 92. Therefore, the contact condition acquisition unit 34 in the contact processing unit 30 can access the schedule management system 92 to acquire schedule information of the user who is the receiver.

Figure 2:
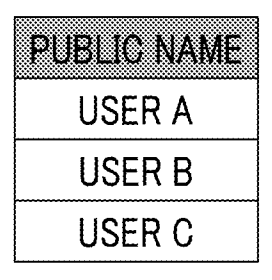

Subsequently, information registered in the registration information management DB 50 will be described with reference to FIGS. 2 and 3. FIG. 2 is a diagram illustrating a list of public names registered in the registration information management DB 50. The public name is an example of the ID information, and is information set so as to specify the user who is a receiver, and is disclosed and managed such that a third party can refer to it. As the public name, for example, a name such as a user's name, a name obtained by combining a title and a name, a nickname, or the like are used which allow the user to be specified by a person who has referred to the name. In FIG. 2, three public names of user A, user B, and user C, who are the user's names, are shown.

FIG. 3 is a diagram illustrating a contact destination list for the user A. The contact destination list includes items of "contact tool", "type", "contact information", "priority", "available contact when going out", "available contact when leaving a seat", and "available contact from abroad". The item of the contact tool represents the communication means used for the contact. Even in a case where the receiver terminal 80 used is the same, in a case where different communication forms and contact information are used, this case is treated as different contact tools (for example, even in a case where the same portable terminal 82 can use e-mail and voice communication, these are different contact tools). In FIG. 3, e-mail, SNS, chat, fixed telephone, and mobile phone are registered.

The type is one in which the feature of the contact tool is classified into "send type", "send type (with immediacy)", and "immediate type". The send type is a type of contact tool such as e-mail, fax, or the like, in which communication is broken at the stage of sending a message. The send type (with immediacy) is a contact tool of a type such as SNS, chat, or the like, in which communication is broken by sending a message, but which is designed to send a response message immediately in the software used for the communication. The immediate type is a contact tool of a real-time conversation type, such as a voice call such as a fixed phone and a mobile phone.

The contact information is information designated as a destination in a case of contacting the user A in each contact tool. For example, in the case of e-mail, the e-mail address "hogehoge@example.com" is the contact information, and in the case of a mobile phone, the telephone number "090-1234-5678" is the contact information.

Plural types of contact information can be set for one contact tool. For example, for e-mail, it is permitted to set two e-mail addresses as contact information. In this case, which e-mail address to contact can be adjusted by the following priority setting.

The priority is information for selecting contact information for contacting the user A. In the example of FIG. 3, the priority is displayed as a positive integer value, and the lower the numerical value, the higher the priority is set. Specifically, the priority of the e-mail given 1 is the highest, and the priority of the mobile phone given 5 is the lowest. In a case of selecting contact information, contact information with the highest priority is selected from selectable contact information.

Contact conditions are set all for the items of "available contact when going out", "available contact when leaving a seat", and "available contact from abroad", and the circled items indicate that the contact conditions are satisfied.

"Available contact when going out" and "available contact when leaving a seat" are examples of contact conditions based on the schedule of the user who is a receiver, and each indicate the contact information that can be contacted in a case where the user is out of the office and the user leaves near his seat in the office. In the example of the user A in FIG. 3, it is set that contact is possible with SNS and the mobile phone when going out. Therefore, in the time zone when it is determined from the schedule information that the user is going out, only the SNS with priority 2 and the mobile phone with priority 5 are to be selected. Further, during the time zone when the user A is leaving a seat, only the send type contact tool is to be selected, and it is possible to select one from the e-mail with priority 1, the SNS with priority 2, and the chat with priority 3. In addition, other examples of the contact condition based on the schedule of the user who is the receiver include availability of contact in the presence, availability of contact in the meeting, availability of contact in break, availability of contact when foreign business trip, availability of contact outside working hours, and the like.

"Available contact from abroad" is an example of contact conditions based on the attribute of the user who is a caller, and indicates contact information that can be contacted in a case where the place of origin of the user is a foreign country. In the example of FIG. 3, only the e-mail with priority 1 and the SNS with priority 2 are set as contact information that can be contacted. In the contact relay system 10, for example, the place of origin can be specified, by referring to the IP address in the communication information that the caller makes a contact request. In addition, other examples of the contact condition based on the attribute of the user who is the caller include availability of contact by the user's title, job, belonging organization, or the like, availability of contact by the language used by the user, availability of contact due to the time difference with the place of origin of the user, and the like.

Plural contact conditions can be determined at the same time, in which case a contact tool satisfying all the conditions determined is selected. For example, in a case where there is a contact from abroad when the user A is going out, SNS with a priority of 2 is selected as a contact tool that satisfies both the conditions for contacting when going out and for contacting from abroad.

Here, the operation of the contact relay system 10 will be described. In the description, a case where the user B contacts the user A is taken as an example. In the contact relay system 10, normally, the user B operates the application installed on the caller terminal 70 to make a contact request. In the application, a contact tool that can be contacted from the caller terminal 70 is checked in advance and set. Subsequently, the user B searches for the public name of the user A who wants to contact, and sends a contact request to the contact relay system 10 by pressing the contact button.

Figure 4:
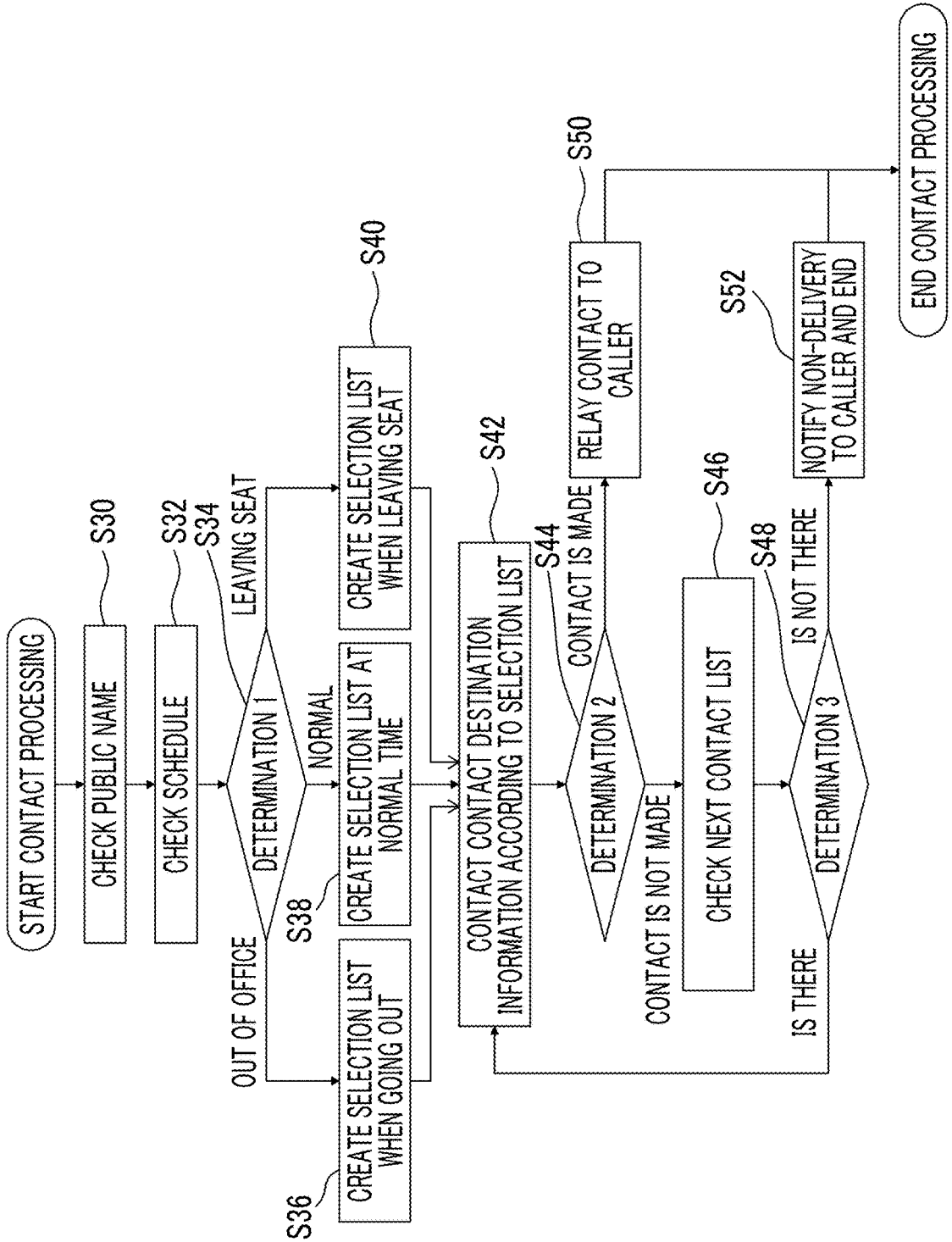
FIG. 4 is a flowchart showing the flow of processing in the contact relay system.

FIG. 4 is a flowchart showing the flow of processing in the contact relay system 10 in a case where a request for contact is made from the caller terminal 70. In a case where the contact request reception unit 32 receives a contact request, first, the contact relay system 10 checks whether the received public name of the user A is stored in the registration information management DB 50 (S30). In a case where there is the public name, the contact condition acquisition unit 34 acquires the contact conditions for the user according to the public name. In the example of FIG. 5, the schedule management system 92 is accessed to acquire the schedule information of the user A (S32). Thereby, in the "determination 1", the current situation of the user is determined (S34). In the example of FIG. 4, one of three states of "out of office", "normal", and "leaving a seat" is determined.

The contact selection unit 36 refers to the registration information management DB 50 and creates a selection list according to the state of the user A. That is, in a case where the user A is going out, the selection list when going out is created (S36). The selection list is created by taking out the contact tools of "available contact when going out" and contact information from the contact destination list shown in FIG. 3 and arranging the contact tools in order of priority. FIG. 5 shows the selection list created in this manner. In the selection list, SNSs and mobile phones are arranged in descending order of priority, and corresponding contact information is also described.

In the case of the normal case, the contact selection unit 36 creates a selection list at the normal time (S38). This selection list is created by arranging all the contact tools and contact information shown in FIG. 3 in order of priority. FIG. 6 shows the selection list created in this manner. In the selection list, e-mails, SNSs, chats, fixed phones, and mobile phones are arranged in descending order of priority, and corresponding contact information is also described.

Similarly, in the case where the user is leaving a seat, the contact selection unit 36 creates a selection list when leaving a seat (S40). FIG. 7 shows an example of the selection list when leaving a seat. In the selection list, e-mails, SNSs, and chats are arranged in descending order of priority, and corresponding contact information is also described.

The contact relay unit 40 contacts the contact information according to the selection list created in this way (S42). For example, in a case where the selection list when going out shown in FIG. 5, in the contact relay system 10, the caller terminal 70 displays that the user A is out of office and the SNS is selected, and prompts the user to input a message. In a case where the user B inputs a message, the message is temporarily stored in the contact status management DB 60. Subsequently, the contact relay unit 40 transmits the message to the contact information "SNS_hoge" of the SNS of the user A, and thereafter, updates the contact status of the contact status management DB 60. Further, the contact relay unit 40 notifies the screen of the caller terminal 70 of the user B that the message has been transmitted. After that, in a case where there is a reply of the message, the contact relay unit 40 determines that the contact is made in "determination 2" (S44), and relays the contact by transmitting a reply message to the caller (S50).

Figure 8:
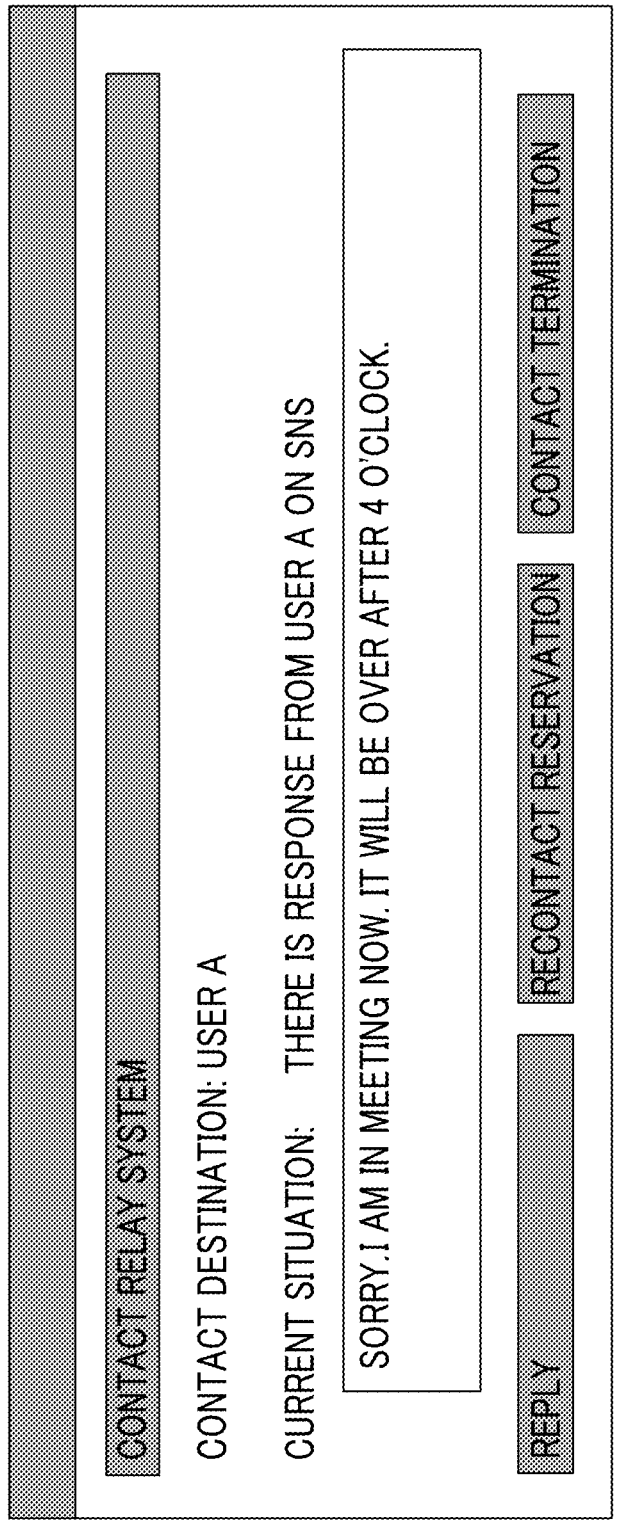
FIG. 8 is a diagram showing an example of a display mode in contact relaying using SNS.

FIG. 8 shows a display example on the screen of the caller terminal 70 of the user B, in a case where there is a response from the user A on SNS. Here, messages that it is a contact from the "contact relay system", the "contact destination" is the "user A", and the "current situation" is "there is a response from the user A on SNS." are described. Then, a message from user A, "Sorry. I am in a meeting now. It will be over after 4 o'clock" is displayed. Below the message, a "reply" button, a "recontact reservation" button, and a "contact termination" button are displayed, and can be selected by the user B.

In a case where the user B presses the "reply" button, an input field for a reply message is displayed. The reply message is immediately sent by the user B inputting a reply message and pressing the send button. In a case where the "recontact reservation" button is pressed, a field for inputting reply message and a field for selecting a desired reservation time of recontact appear. Thereby, the user B can transmit a reply message at the desired reservation time of recontact. In a case where the "contact termination" button is pressed, the processing of the contact relay ends.

On the other hand, even in a case where the set time has elapsed, in a case where there is no reply to the message, it is determined that the contact has failed and the contact cannot be made in "determination 2" (S44). Since SNS is positioned as a "send type (with immediacy) contact tool, a relatively shorter time is allocated as a set time, compared with e-mail. Then, the contact relay unit 40 updates the contact status of the contact status management DB 60, and then checks the next contact tool and contact information in the selection list shown in FIG. 5 (S46). In "determination 3" (S48), in a case where there is the next contact tool and contact information in the selection list, the process returns to the step of S42. In the example of the selection list shown in FIG. 5, the mobile phone is called.

Figure 9:
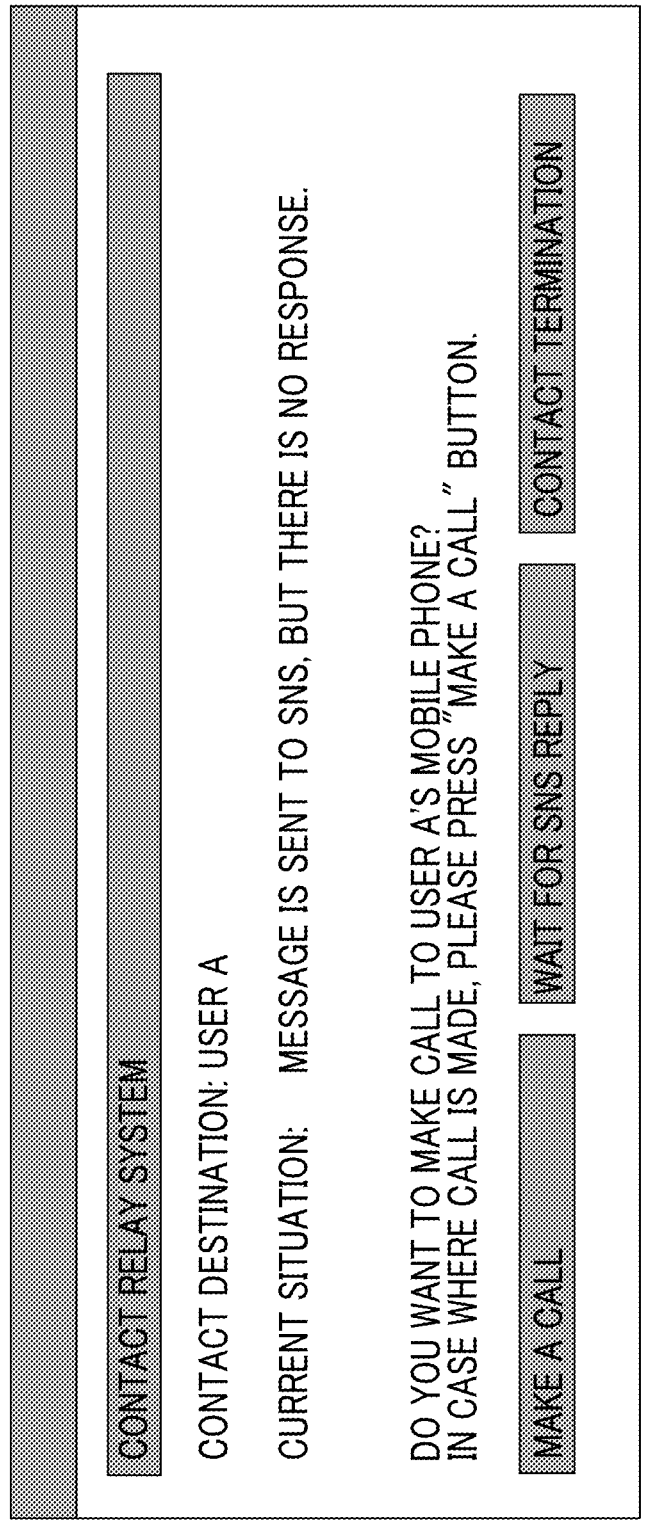
FIG. 9 is a diagram showing an example of another display mode in contact relaying using SNS.

FIG. 9 shows a display example on the caller terminal 70 of the user B at this stage. Here, there is a contact from the "contact relay system", the "contact" is "user A", or the "current situation" is that "a message is sent to the SNS, but there is no response." is described. Then, the message "Do you want to make a call to the user A's mobile phone? In a case where a call is made, please press the "make a call" button." is described. Below the message, a "make a call" button, a "wait for SNS reply" button, and a "contact termination" button are displayed, and can be selected by the user B.

In a case where the user B presses the "make a call" button, the contact relay unit 40 of the contact relay system 10 calls the mobile phone "090-1234-5678" of the user A, and switches the caller terminal 70 of the user B to voice connection. In addition, in a case where the user A picks up the phone, guidance such as "A call is received from the user B. In a case where you want to relay the call, select "Relay" with tone pulse" by automatic voice is provided. As a result, in a case where the user A wants to relay, a voice connection is made to the caller terminal 70 of the user B. On the other hand, in a case where the user A does not want to relay the call, or in a case where the user A does not receive the call, the voice connection at the caller terminal 70 is disconnected, and a message such as "The call is refused" or "connection by telephone is not possible." is displayed on the screen. In this case, the process from step S46 is repeated. Then, in Determination 3, at a time point when there is no next contact tool and contact information in the selection list, the user B is notified of the non-delivery, and the process ends. However, even in a case where the user A receives a call, in a case where the call is refused, it is possible to perform processing such as canceling an immediate type of contact including a fixed telephone in subsequent connections.

In the above description, an example using the contact destination list shown in FIG. 3 has been described. In the contact destination list, as described above, as the contact condition, the contact tools of "available contact when going out", "available contact when leaving a seat", and "available contact from abroad" and contact information are set. Then, the contact tool and contact information satisfying the contact conditions are selected according to the fixed priority. However, it may be considered that the user who is a receiver has a request to change the priority according to the situation. Therefore, next, with reference to FIG. 10, a mode where the priority can be changed will be described.

FIG. 10 is a view showing an example of the contact destination list of the user A, as in FIG. 3. However, in FIG. 10, each mode of "normal mode", "contact mode", and "send type mode" is set. The normal mode is a mode that is set in a case where the user A does not make any particular instruction. Further, the contact mode and the send type mode are modes set by the user A inputting the name. Priorities are set in these modes, respectively.

In the normal mode, priorities are set in order of e-mail, SNS, chat, fixed phone, and mobile phone. That is, in the normal mode, the priority of the send type contact tool is set high, and the priority of the immediate type contact tool is set low.

In the contact mode, the order of priority is changed, and priorities are set in the order of fixed telephone, mobile phone, SNS, chat, and e-mail. This priority is set by giving priority to the user A to receive a contact by an immediate type contact tool, and giving priority to receive the contact by a next send type contact tool with promptness In a case where the user A wants to make a telephone call, the user A is in the contact mode and waits for contact. In such a mode in which priority is given to immediate type contact, for example, the response waiting time of the other party when the contact is made by SNS is set short, and in a case where there is no contact from the user A, the contact by the next contact tool may be performed promptly.

In send type mode, send type (including a type with immediacy) contact tools such as e-mail, SNS and chat are set in the same priority order as normal mode, but fixed phones and cell phones which are immediate type contact tools are not prioritized. Therefore, in the send type mode, the user A is contacted only by the send type contact tool, and is not contacted by the prompt type contact tool.

The user A accesses the contact relay system 10 from the receiver terminal 80 and sets these modes and the corresponding priorities. In addition, the mode change may be performed each time by the user A accessing the contact relay system 10, or may be automatically changed according to, for example, schedule information managed by the schedule management system 92. Processes such as mode setting and change is performed by the mode change unit 22 in the registration information processing unit 20 of the contact relay system 10.

The contact destination list shown in FIG. 3 may be merged with the contact list shown in FIG. 10. For example, by adding contact conditions such as "available contact when going out", and "available contact when leaving a seat" shown in FIG. 3 to the contact destination list shown in FIG. 10, even in each mode, only contact that meets the contact conditions will be made.

In the above description, it has been described on the assumption that the contact relay system 10 is introduced to an organization such as a company. However, the contact relay system 10 is not limited to use as an organization. For example, it is also applicable to an application in which an individual who wants to avoid the disclosure of his or her contact information registers with the contact relay system 10 for the purpose of business or private, and discloses the public name.

Further, although the contact relay system 10 can be used as a single system, it may be incorporated into an existing contact tool and used. For example, in constructing a system for communicating with a third party using SNS, introducing contact by the contact relay system 10 is not limited to the SNS-specific contact tool, and it is possible to make various contacts such as e-mail, and mobile phone.

Further, in the above description, it is assumed that there is no particular limitation on a user who is a caller who makes a contact request to the contact relay system 10. Such a system can be used, for example, for applications in which the user who is the receiver is a retailer, a restaurant, or the like and the user who is the caller is general consumers. However, for example, users who can be callers may be limited to users who can be receivers. In this case, a closed system is constructed in which the public name of the user who is the receiver is disclosed only to the users who are the other receivers.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A contact system comprising:
a processor configured to:
disclose and manage ID information for specifying a user to a third party;
give priorities to respective pieces of contact information of the user of a plurality of contact tools, and manage the respective pieces of contact information in a private manner to the third party;
receive a contact request designating the ID information as a contact destination from the third party;
select contact information to be used, from the respective pieces of contact information of the user according to the received ID information, based on the priorities and an availability of the user; and
relay contact by the corresponding contact tool, by using the selected contact information,
wherein the processor manages a priority for each of a plurality of modes set by the user, and receives a mode change from the user,
wherein the plurality of contact tools includes an immediate type contact tool and a send type contact tool,
wherein the plurality of modes includes a mode in which the priority of the contact information in the immediate type contact tool is enhanced, and a mode in which the priority of the contact information in the send type contact tool is enhanced, and
wherein the plurality of modes comprises a normal mode, a contact mode and a send type mode, wherein
in the normal mode, the priority of the send type contact tool is set high, and the priority of the immediate type contact tool is set low,
in the contact mode, the priority is set to receive a contact by the immediate type contact tool, and giving priority to receive the contact by a next send type contact tool promptly, and
in the send type mode, in response to the contact request from the third party, the user is contacted only by the send type contact tool in response to the contact request from the third party, and is not contacted by the immediate type contact tool.

2. The contact system according to claim 1,
wherein the processor manages the contact information to be used for each contact condition,
acquires the contact condition, and
selects the contact information according to the acquired contact condition.

3. The contact system according to claim 2,
wherein the contact condition is a condition regarding a schedule of the user, and
wherein the processor acquires the contact condition from schedule information of the user.

4. The contact system according to claim 2,
wherein the contact condition is a condition regarding the third party, and
wherein the processor acquires the contact condition from attribute information of the third party.

5. The contact system according to claim 1,
wherein in a case where the relaying of the contact using certain contact information selected by the processor is not available, the processor relays a contact using next contact information selected by the processor.

6. A non-transitory computer readable medium storing a contact program causing a computer to:
disclose and manage ID information for specifying a user to a third party;
give priorities to respective pieces of contact information of the user of a plurality of contact tools, and manage the respective pieces of contact information in a private manner to the third party;
receive a contact request designating the ID information as a contact destination from the third party;
select contact information to be used, from the respective pieces of contact information of the user according to the received ID information, based on the priorities and an availability of the user; and
relay the contact by the corresponding contact tool using the selected contact information,
wherein the computer manages a priority for each of a plurality of modes set by the user, and receives a mode change from the user,
wherein the plurality of contact tools includes an immediate type contact tool and a send type contact tool,
wherein the plurality of modes includes a mode in which the priority of the contact information in the immediate type contact tool is enhanced, and a mode in which the priority of the contact information in the send type contact tool is enhanced, and
wherein the plurality of modes comprises a normal mode, a contact mode and a send type mode, wherein
in the normal mode, the priority of the send type contact tool is set high, and the priority of the immediate type contact tool is set low,
in the contact mode, the priority is set to receive a contact by the immediate type contact tool, and giving priority to receive the contact by a next send type contact tool promptly, and
in the send type mode, in response to the contact request from the third party, the user is contacted only by the send type contact tool in response to the contact request from the third party, and is not contacted by the immediate type contact tool.

7. The contact system according to claim 1,
wherein the selected contact corresponding to the availability of the user comprises available contact when the user going out and an available contact when the user leaving seat.

* * * * *